(12) United States Patent
Diehl et al.

(10) Patent No.: US 6,208,413 B1
(45) Date of Patent: Mar. 27, 2001

(54) HADAMARD SPECTROMETER

(75) Inventors: Torsten Diehl, Fischbachtal; Norbert Lenk, Ilmenau; Rainer Riesenberg; Jürgen Schöneich, both of Jena, all of (DE)

(73) Assignee: Institut fuer Physikalische Hochtechnologie e.V., Jena (DE)

( * ) Notice: Subject to any disclaimer, the term of this patent is extended or adjusted under 35 U.S.C. 154(b) by 0 days.

(21) Appl. No.: 09/380,908
(22) PCT Filed: Mar. 6, 1998
(86) PCT No.: PCT/EP98/01312
 § 371 Date: Sep. 10, 1999
 § 102(e) Date: Sep. 10, 1999
(87) PCT Pub. No.: WO98/40709
 PCT Pub. Date: Sep. 17, 1998

(30) Foreign Application Priority Data

Mar. 13, 1997 (DE) .............................................. 197 10 143

(51) Int. Cl.[7] .................. G01J 3/18; G01J 3/28
(52) U.S. Cl. .................. 356/330; 356/310; 356/330
(58) Field of Search .................. 356/310, 326, 356/328, 330

(56) References Cited

U.S. PATENT DOCUMENTS

| 5,050,989 | 9/1991 | Van Tassel et al. | 356/310 |
| 5,257,086 | 10/1993 | Fateley et al. | 356/328 |
| 5,488,474 | * 1/1996 | Fateley et al. | 356/326 |

* cited by examiner

Primary Examiner—F. L. Evans
(74) Attorney, Agent, or Firm—Jordan and Hamburg LLP

(57) ABSTRACT

The invention relates to a Hadamard spectrometer which enables the detection of a range of polyatomic gases or liquids for example using infrared absorption. The aim of the invention is to produce a spectrometer of this type which provides higher resolution, improved wavelength precision and an improved signal-to-noise ratio using conventional detector lines and which allows a small and compact design. To this end, a detector line (30) with a set interval (a) between the individual detector areas (31) is used for a detector unit (3), and a linear assembly (10) is also used for a light-emitting respective reflective assembly (1). The linear assembly includes (n) adjoining identical light sources (11, 12, 13, 14), n always remaining ≧3, which can be activated individually according to the Hadamard Principle. The individual light sources (11, 12, 13, 14) are positioned at an interval (b) from each other in such a way that b is an integral multiple of a plus or minus 1/n when they are projected onto the detector line.

20 Claims, 7 Drawing Sheets

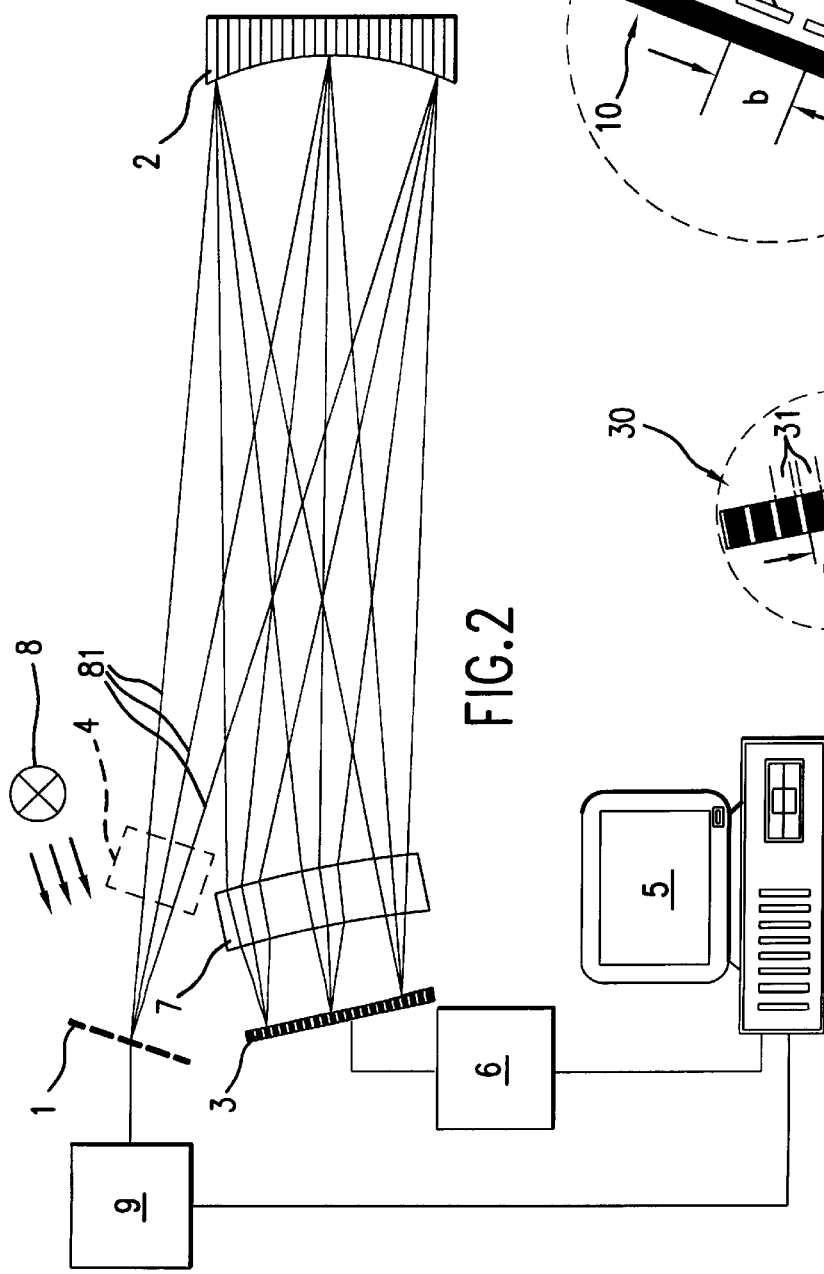
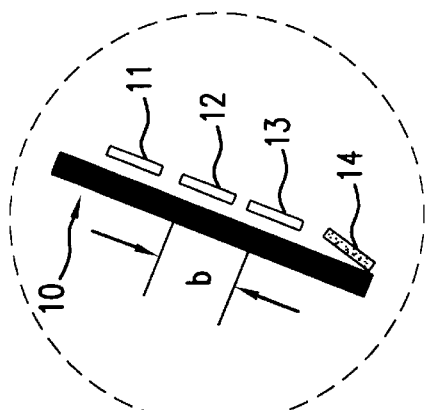
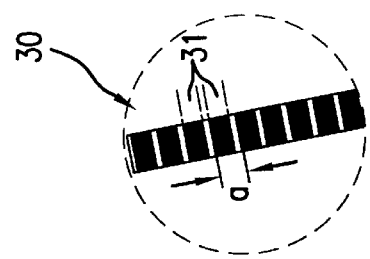

HADAMARD SPECTROMETER

BACKGROUND OF THE INVENTION

The invention relates to a Hadamard spectrometer which enables the detection of a number of polyatomic gases or liquids using, for example, infrared absorption. Such devices are utilized, in particular, for emission control, workplace inspection, and environmental monitoring.

With respect to prior art related to the invention, reference is made to a spectrophotometer disclosed in U.S. Pat. No. 5,257,086 which enables a mathematical evaluation of detected spectral data and, hence, a spectral analysis under use of the Hadamard transformation. The spectrophotometer described therein is provided with a radiation source array, which is typically an essential unit for spectrometers. The individual radiation sources of the radiation source array provide different wavelengths which can be controlled in accordance with the Hadamard method. The spectrophotometer includes an imaging diffraction grating with a detector arranged behind a slit for detecting spectral signals, and electronic units which ensure a very fast spectral analysis of a sample to be examined. The essential advantage resulting from the Hadamard transformation is a considerable improvement of the signal-to-noise ratio. A disadvantage of the arrangement described in U.S. Pat. No. 5,257,086 is that at first LEDs have to be available as radiation sources which correspond to the frequency spectrum to be examined, and this at present limits the arrangement to a wavelength spectrum of from 250 nm to about 2.5 $\mu$m. Another significant disadvantage of this device is that considerable expenditures have to be spent in order to stabilize the intensities of the individual LEDs in order to obtain spectra which can be analyzed quantitatively.

Furthermore, spectrometers are known, namely the monolithic miniature spectrometer designated MMS 1 manufactured by Carl Zeiss, Business Field for Special Engineering, Sales Department for Optical Components, D-73446 Oberkochen, Germany, in which diode rows are employed as detecting elements. In this case, it is required to image a spectral line onto at least three adjacent detector elements. Only the three measurement signals obtained permit a precise detection of the wavelength. Hence, the resolution power of such spectrometers with respect to a wavelength interval is limited by the number of the detector elements employed and their mutual distance.

SUMMARY OF THE INVENTION

It is an object of the present invention to provide a Hadamard spectrometer which, under application of conventional detector rows, ensures an increased resolution power, an improved wavelength accuracy, and an enhanced signal-to-noise ratio, and has a small and compact construction.

The object is realized by providing a Hadamard spectrometer with a detector row having individual detector elements spaced from one another by a set distance and a unit for the light emitting and reflecting having three or more adjacent identical luminous sources. The luminous sources are individually controllable in accordance with the Hadamard principle and arranged apart from one another at a set distance related to the distance between the detector elements.

An important feature of the invention is that row-shaped units, i.e., units having a row of constituent elements, are employed both, for a detector unit for registering spectra and for a light emitting and reflecting unit. The detecting unit includes a plurality of individual detecting ranges or elements and the light emitting and reflecting unit includes a plurality of individual luminous sources. Therefore the designation "double array" is used hereinafter, and the Hadamard principle, known per se, finds application herein.

When within the scope of the invention the Hadamard principle is referred to, then multiplexing in the spectroscopy including entry switching matrices after Hadamard is intended to be encompassed within the meaning of the term.

BRIEF DESCRIPTION OF THE DRAWINGS

The invention will be explained in the following in more detail with reference to the drawings wherein FIG. 2 shows a setup of a Hadamard spectrometer according to the present invention, FIG. 2a shows an illumination row as a part of the Hadamard spectrometer according to FIG. 2, FIG. 2b shows a detector row as a part of the Hadamard spectrometer according to FIG. 2, FIGS. 3a, 3b, 3c and 3d show as an example, the control of an illumination row including four reflecting elements of a unit according to FIG. 2a.

DETAILED DESCRIPTION

Figure 1:
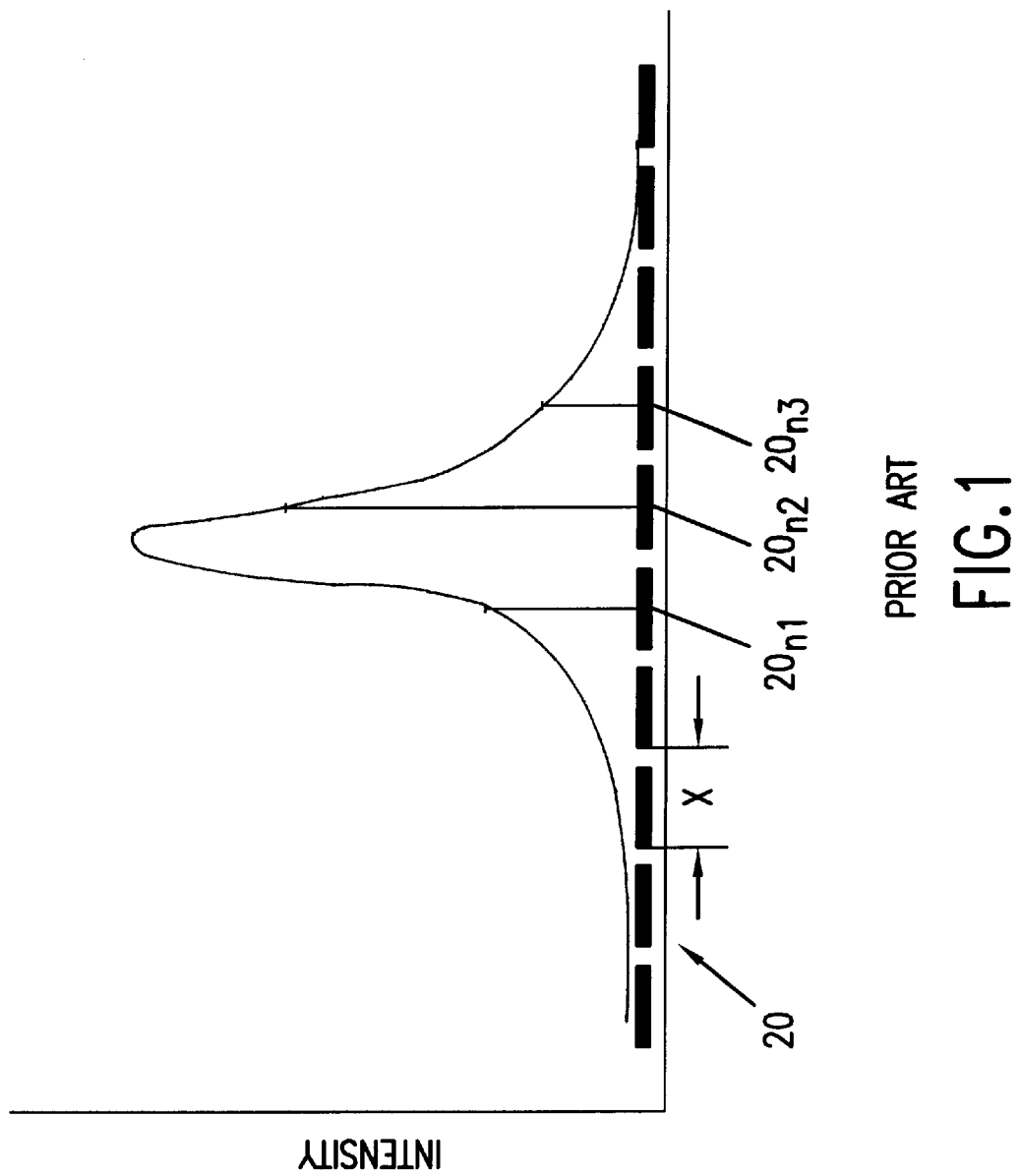
FIG. 1 shows a diode row according to the prior art with a scanning of a spectral line, at least necessary for three times, to obtain a precise detection of wavelength.
Figure 3A:
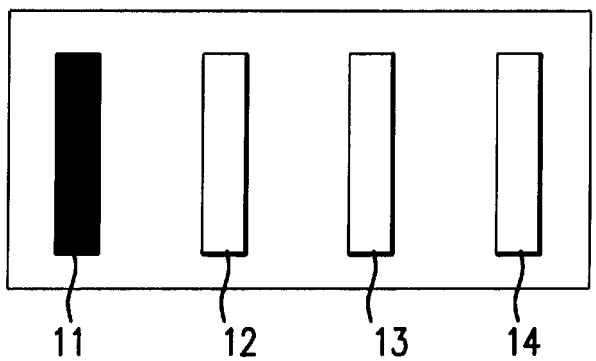
Figure 3B:
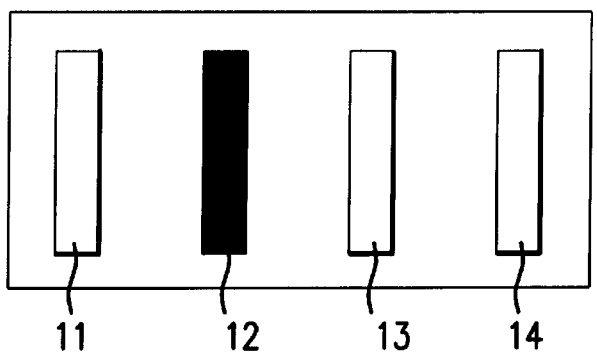
Figure 3C:
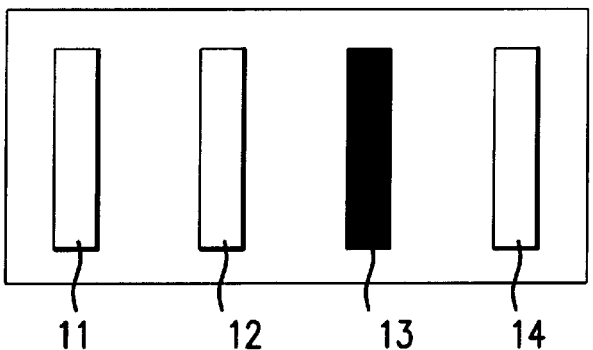
Figure 3D:
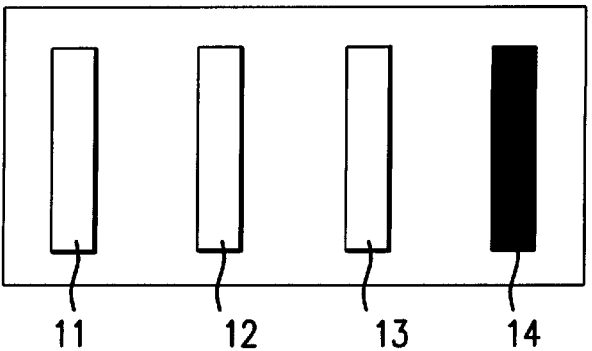

FIG. 1 schematically shows a part of a conventional diode row spectrometer comprising a plurality of adjacently arranged detector elements 20. In order to be able to carry out a precise wavelength determination it is, however, required to image a spectral line upon at least three adjacent detector elements 20$n$1, 20$n$2, 20$n$3. Thus, as can be seen in FIG. 1, the resolution power of such a spectrometer with respect to a wavelength interval is limited by the number and the distance x of the individual detectors 20.

FIG. 2 shows a first embodiment of the invention including essential components which are required in a Hadamard spectrometer. A first unit 1 reflects light, represented by three parallel arrows and which has been emitted from a light source 8, and is formed by a line 10 which is provided with micro mirrors spaced apart equidistant from one another and each being separately tiltable. In the example, there are four micro mirrors 11,12,13,14 shown in FIG. 2a in more detail. The width of each mirror is 20 $\mu$m and the length of each mirror is 183.5 $\mu$m. Furthermore, there is an imaging grating 2 provided having a diameter of 41 mm, an inside radius of 138 mm, an object-side back focus of 156.9 mm and an image-side back focus of 128 mm with respect to a mean wavelength of 350 nm. A CCD-line 30, also referred to as a detector row herein, has 1024 pixels with a center-to-center distance of 25 μm each and, accordingly, a length of 25.6 mm, and is employed as a detector unit 3. A flattening lens 7 is arranged, in the direction of light propagation, in front of the CCD line 30 in order to ensure an improved resolution over an entire preset spectral range. For the sake of clarity only the principal beams 81 are represented in FIG. 2.

The mirrors of the line 10 which, in the example, form the luminous sources are adapted to be individually activated. They are, as indicated by example of FIGS. 3a, 3b, 3c and 3d, successively controlled in accordance with a preset pattern, preferably the pattern of the lines of a HADAMARD-S matrix. Bright areas in FIGS. 3a, 3b, 3c and 3d are indicative of mirrors reflecting in the direction of the grating 2, dark areas are indicative of diaphragmed out mirrors (see also mirror 14 in FIG. 2a). Each reflecting mirror produces a spectrum on the CCD line 30. The spectra of the respective reflecting mirror are superimposed on the CCD line 30.

For further explanation of the invention, the 250 nm spectral line of a Hg lamp is employed in the example, which is triply generated in each case (by three mirrors), instead of analyzing the effect of a sample which is, for example, provided in a receptacle (space) 4. The variants of the pattern are successively imaged so that four measurements are required in the example. It is feasible to control the micro mirrors 11,12,13,14 in accordance with the Hadamard principle via a control unit 9, which is controlled in turn by an evaluating and processor unit 5. It is essential in the invention that the micro mirrors 11,12,13,14,..., n, wherein n>3, are arranged relative to each other at a defined distance b such that, when the micro mirrors are imaged upon the detector row 30, distance b amounts to an integral multiple of the preselected mutual distance a provided for the detecting ranges or elements 31, plus 1/n or minus 1/n. Note that the distance a is measured from an edge of one detecting range 31 to the corresponding edge of an adjacent detecting range 31 (FIG. 2b) and the distance b is measured from an edge of each micro mirror to the corresponding edge of an adjacent micro mirror (FIG. 2a). In this manner, it is not necessary that the defined distances amount to a continuous succession of respective integral multiples of the preselected distance a plus 1/n or minus 1/n. It is important though that the individual luminous sources are arranged relative to each other at a distance b such that when imaged upon the detecting row, the distance of the light/luminous sources amounts to an integral multiple of m/n, wherein m is an integer greater than n. Thus, for example, in the case of n=4 the following sequence is feasible: ¼, ²⁄₄, ¾, ⁴⁄₄ or ²⁄₄, ⁴⁄₄, ¾, ¼ or ¼, ⁵⁄₄, ¹¹⁄₄, ¹⁶⁄₄ or ¾, ⁶⁄₄, ⁹⁄₄, ¹²⁄₄ or ¾, ⁹⁄₄, ⁶⁄₄, ¹²⁄₄ or ¾, ¹⁰⁄₄, ¹⁷⁄₄, ²⁴⁄₄. Therefore, it is only essential that all fractions of n, supplemented each by integral multiples of the distances, are contained in the images of the luminous sources.

In a subsequent electronic evaluation of the spectral signals, obtained during the individual measurements by means of the CCD line 30 and amplified by an amplifier unit 6, a "lateral" backward displacement of the spectra is carried out, in addition to a Hadamard-transformation, in the evaluation unit 5. This displacement is adapted to the respective pattern by which the micro mirrors have been controlled.

Figure 4A:
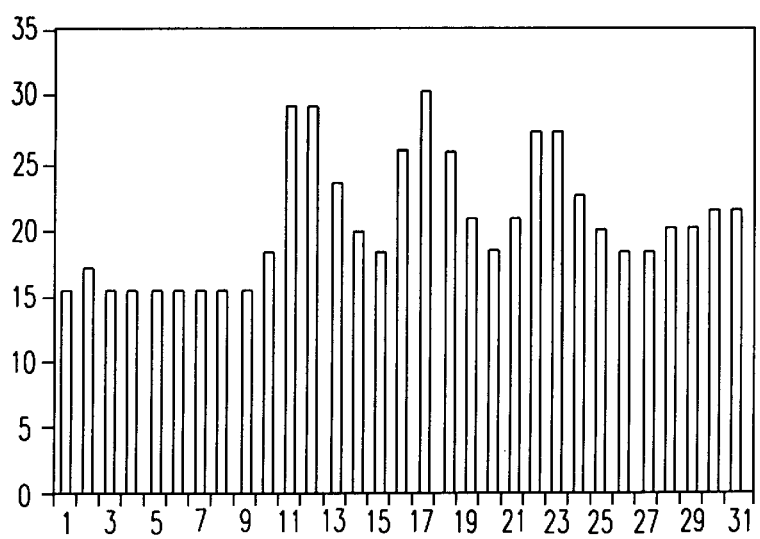
FIGS. 4a, 4b, 4c and 4d show as an example, the spectral distributions obtained within the scope of the invention from four measurements with differently controlled individual luminous sources.
Figure 4B:
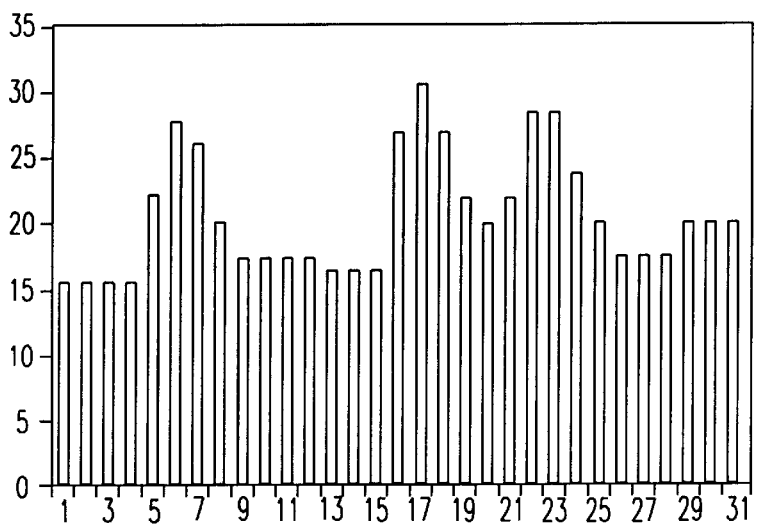
Figure 4C:
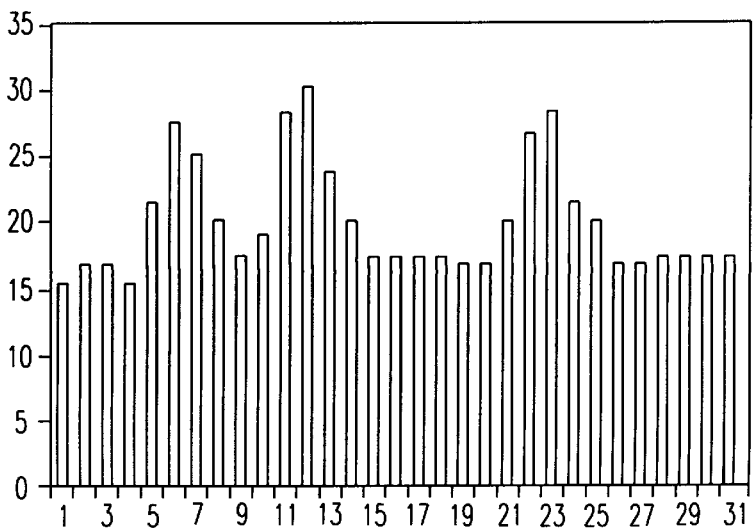
Figure 4D:
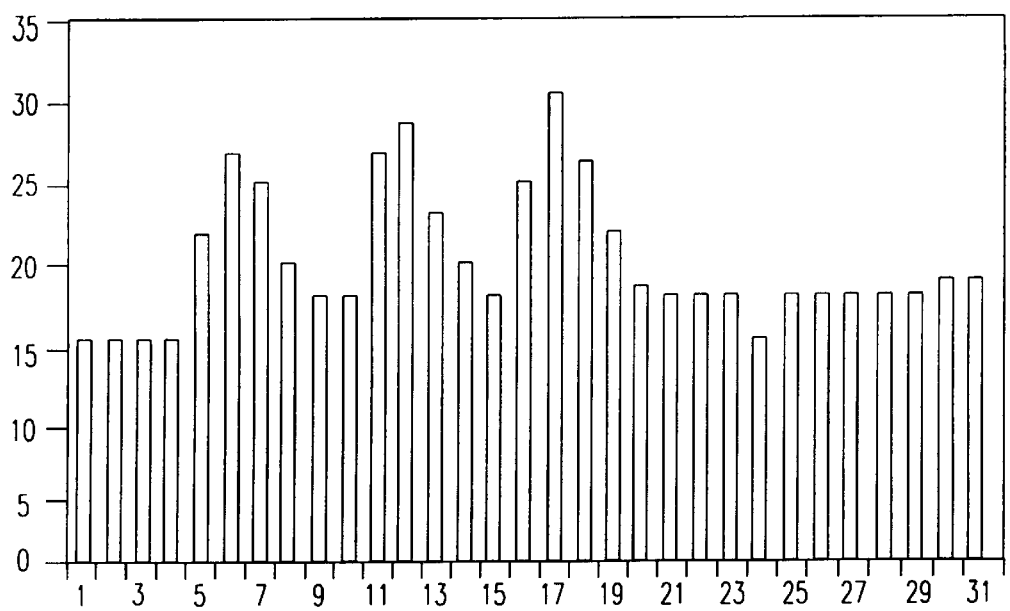
Figure 4E:
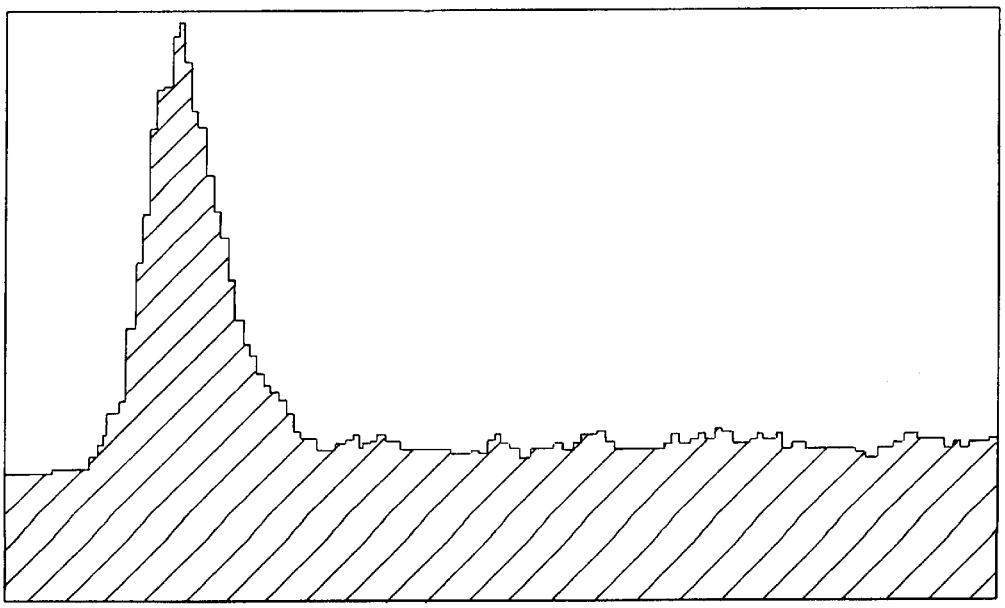
FIG. 4e shows a spectral signal curve prepared in accordance with the present invention.

FIGS. 4a, 4b, 4c and 4d illustrate the spectral representations obtained from the four single measurements mentioned above, which are required in the example, and which correspond to the respective combinations of reflecting micro mirrors. The experimental final result is shown in FIG. 4e. The form of the spectral line is resolved by the aid of the arrangement of an input reflecting row for the double-array spectrometer with only four mirrors, described in FIG. 2. The resolution is increased remarkably. Simultaneously, the departures in the single measurements are reduced and the signal-to-noise ratio is enhanced.

In this manner, the pixel limited resolution of available detector rows can be increased by about a factor of 3 compared to conventional diode array spectrometers. When increasing the number of the entry mirrors, it is feasible to further improve the signal-to-noise ratio. For example, if 103 entry mirrors are used, the signal-to-noise ratio can at least be improved by a factor of 10, at the same total measuring time which is divided up into 103 single measurements.

Figure 5:
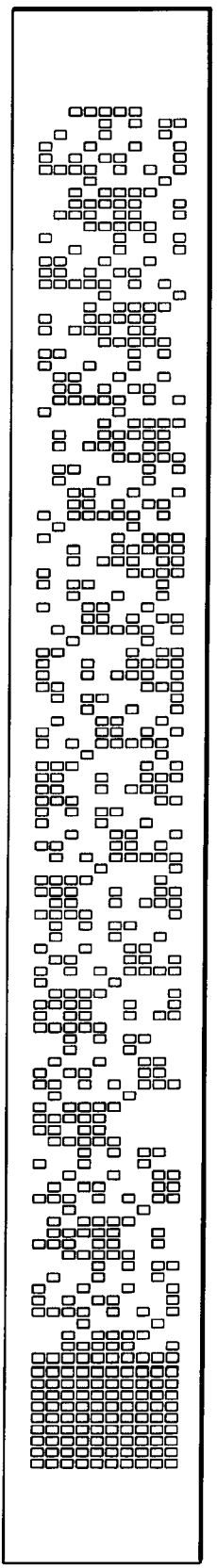
FIG. 5 shows a micro-slit row of individually closeable illuminated slit elements which may be used as the luminous sources in accordance with an embodiment of the invention.
Figure 6:
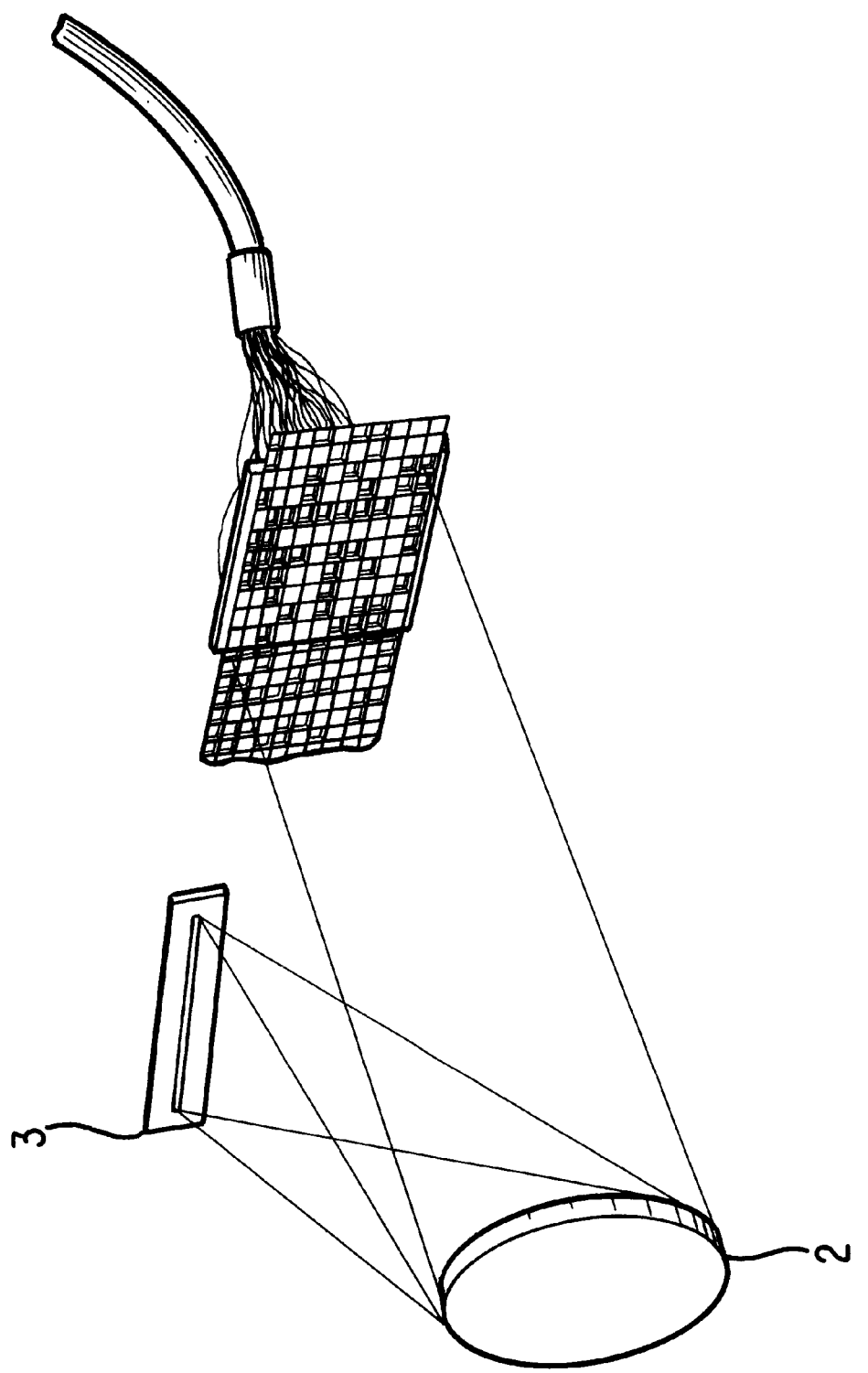
FIG. 6 shows a fiber optical row of individually controllable luminous light conducting fibers which may be used as the luminous sources in accordance with an embodiment of the invention.

Within the scope of the invention, it is feasible to utilize for the emitting and reflecting unit 1, instead of the above described embodiments in the form of micro mirrors, individually closeable illuminated slit elements of a micro-slit row (as shown in FIG. 5) and individually controllable luminous light conducting fibers of a fiber optical row (as shown in FIG. 6), whereby the same measures as for the above described micro mirrors are valid for the mutual arrangement of the individual slits and the individual light conducting fibers.

The Hadamard spectrometer in accordance with the invention can be employed over a wide spectral range of from the ultraviolet (UV) to the far infrared range (IR). By means of a specific comparative measurement task, the advantages of the invention will be outlined with respect to a compact construction of the spectrometer.

For the monitoring of a carcinogenic benzol with a concentration of 1 ppm in, for example, the IR range, a spectrometer including efficient components (CCD-rows) is required to provide for an absorption way in an order of magnitude of 60 cm, due to the low optical density and, hence, a typical prior art spectrometer cannot be used effectively. With an embodiment of the Hadamard-spectrometer as disclosed herein, an embodiment comprising, for example, 103 micro mirrors requires an absorption way of only about 6 cm. In this manner, it is feasible to provide small and compact instruments which can be adapted to different monitoring tasks at improved device parameters.

All features disclosed in the specification, in the subsequent claims, and in the drawing are substantial for the invention both, individually and in any combination with one another.

What is claimed is:

1. A Hadamard spectrometer comprising:
   a luminating unit, having a row of n luminous sources controllable according to the Hadanard-principle wherein n is greater than or equal to three, said luminous sources being separate from and adjacent one another,
   an imaging grating arranged to receive light from a direction of said luminous sources,
   a detecting unit including a detector row of detecting elements, said detecting elements being separate from one another and arranged at a distance a from one another, said detecting unit being arranged to receive light beams from said imaging grating,
   a receptacle for receiving samples to be spectrally analyzed interposed between said luminating unit and said imaging grating, and
   electronic units coupled to said ruminating unit and said detecting unit for performing a Hadamard-transformation and for signal detection and signal evaluation, said luminous sources being arranged relative to one another such that an edge of each of said luminous sources is spaced a distance b from the corresponding edge of adjacent ones of said luminous sources, the distance b being set so that, when imaged upon said detector row, the distance b amounts to an integral multiple of a plus a/n or minus a/n.

2. The Hadamard spectrometer according to claim 1, wherein said luminous sources are individually selectable illuminated micro mirror elements of a micro mirror row.

3. The Hadamard spectrometer according to claim 1, wherein said luminous sources are individually closeable illuminated slit elements of a micro slit row.

4. The Hadamard spectrometer according to claim 1, wherein said luminous sources are individually selectable luminous light conducting fibers of a fiber optic row.

5. The Hadamard spectrometer according to claim 1, wherein said luminous sources are micro mirrors.

6. The Hadamard spectrometer according to claim 5, wherein said luminating unit comprises a light source for directing light at said micro mirrors from the ultraviolet range to the infrared range.

7. The Hadamard spectrometer according to claim 1, wherein said receptable is situated between said luminous sources and said imaging grating.

8. The Hadamard spectrometer according to claim 1, wherein said electronic units comprise an amplifier coupled to said detector unit.

9. The Hadamard spectrometer according to claim 1, wherein said detecting elements are CCDs.

10. The Hadamard spectrometer according to claim 1, further comprising a lens arranged proximate said detector unit and between said imaging grating and said detector unit for improving resolution on said detector unit.

11. A Hadamard spectrometer comprising:
  a luminating unit having a row of n luminous sources controllable according to the Hadamard-principle wherein n is greater than or equal to three, said luminous sources being separate from and adjacent one another,
  a detector row of detecting elements arranged at a distance a from one another, said detecting elements being separate and spaced apart from one another,
  an imaging grating arranged to receive light from a direction of said luminous sources and reflect light toward said detector row,
  a receptacle for receiving samples to be spectrally analyzed interposed between said luminating unit and said imaging grating,
  an evaluating and processor unit coupled to said luminating unit and said detecting elements for performing a Hadamard-transformation and for signal detection and signal evaluation, and
  said luminous sources being arranged relative to one another such that an edge of each of said luminous sources is spaced a distance b from the corresponding edge of adjacent ones of said luminous sources, the distance b being set so t hat, when imaged upon said detector row, the distance b amounts to an integral multiple of a plus a/n or minus a/n.

12. The Hadamard spectrometer according to claim 11, wherein said luminous sources are micro mirrors.

13. The Hadamard spectrometer according to claim 12, wherein said luminating unit comprises a light source for directing light at said micro mirrors.

14. The Hadamard spectrometer according to claim 11, wherein said receptacle is situated between said luminous sources and said imaging grating.

15. The Hadamard spectrometer according to claim 11, further comprising an amplifier interposed between said detector row and said evaluation and processor unit.

16. The Hadamard spectrometer according to claim 11, wherein said detecting elements are CCDs.

17. The Hadamard spectrometer according to claim 11, further comprising a lens arrange proximate said detector row and between said imaging grating and said detector row for improving resolution on said detecting elements.

18. The Hadamard spectrometer according to claim 11, wherein said luminous sources are individually selectable illuminated micro mirror element of a micro mirror row.

19. The Hadamard spectrometer according to claim 11, wherein said luminous sources are individually closeable illuminated slit elements of a micro slit row.

20. The Hadamard spectrometer according to claim 11, wherein said luminous sources are individually selectable luminour light conducting fibers of a fiber optic row.

* * * * *